United States Patent [19]

Meunier

[11] Patent Number: 5,510,854
[45] Date of Patent: Apr. 23, 1996

[54] DEVICE FOR ADJUSTING THE BLACK LEVEL OF A VIDEO SIGNAL

[75] Inventor: Thierry Meunier, Pommiers La Placette, France

[73] Assignee: SGS-Thomson Microelectronics, S.A., Pouilly, France

[21] Appl. No.: 238,687

[22] Filed: May 5, 1994

[30] Foreign Application Priority Data

May 19, 1993 [FR] France .................... 93 06250

[51] Int. Cl.$^6$ ............................................ H04N 5/16
[52] U.S. Cl. .................. 348/695; 348/682; 348/697; 327/362
[58] Field of Search .................... 348/257, 677, 348/689, 695, 696, 697, 682, 684, 678; 327/331, 332, 362, 363; H04N 5/16, 5/53

[56] References Cited

U.S. PATENT DOCUMENTS

| | | | |
|---|---|---|---|
| 4,470,066 | 9/1984 | Wolber et al. | 358/171 |
| 4,599,572 | 7/1986 | Nakayama | 330/69 |
| 4,811,101 | 3/1989 | Yagi | 348/696 |
| 4,884,141 | 11/1989 | Hyakutake | 348/678 |
| 5,027,017 | 6/1991 | Fling | 348/695 |

FOREIGN PATENT DOCUMENTS

| | | | |
|---|---|---|---|
| 0301601 | 2/1989 | European Pat. Off. | H04N 5/16 |
| 668197 | 3/1952 | United Kingdom | H04N 5/16 |

OTHER PUBLICATIONS

Patent Abstracts of Japan, vol. 12, No. 7 (E–571), Jan. 9, 1988 & JP-A-62165482 (Yokogawa Electric).

*Primary Examiner*—James J. Groody
*Assistant Examiner*—Jeffrey S. Murrell
*Attorney, Agent, or Firm*—Wolf, Greenfield & Sacks

[57] ABSTRACT

A device for adjusting a video signal so that its black level is in coincidence with a predetermined reference level includes a capacitor having a first terminal that receives the video signal and a second terminal that provides the adjusted video signal, and means for discharging the capacitor at a constant current when the adjusted video signal exceeds the reference level, and for charging the capacitor at a constant current when the adjusted video signal is below the reference level, the ratio between the charging and discharging currents ranging from 4.3 to 12.6. The device further includes means for significantly reducing the current ratio at least during a portion of a frame synchronization pulse train.

26 Claims, 3 Drawing Sheets

DEVICE FOR ADJUSTING THE BLACK LEVEL OF A VIDEO SIGNAL

BACKGROUND OF THE INVENTION

1. Field of the Invention

The present invention relates to the processing of video signals and more particularly to the adjustment of the black level of a video signal with respect to a reference level.

2. Discussing of the Related Art

FIG. 1 very schematically represents a portion of a video signal CVBS. This signal includes, below a reference level B, so-called black level, periodic line synchronization pulses S. Between two consecutive pulses S, there sequentially occurs a constant level equal to B, a portion of the active signal conveying line information, and again a constant level equal to B. Each active portion of the video signal lasts for approximately 52 microseconds, and the inactive portion, corresponding to the remaining period, lasts for approximately 12 microseconds. Each synchronization pulse lasts for approximately 4.7 microseconds.

In devices receiving such video signals, such as television sets, it is desired, to suitably use the video signals, to adjust the black level B with a predetermined reference level. This is required, for example, to adjust with a same reference level the black levels of a plurality of video signals to be switched on a channel, or to extract from the video signals the synchronization pulses S that serve as a reference to a phase-looped loop (PLL). Such a PLL serves, more particularly, to synchronize scanning of the screen with pulses S.

FIG. 2 is a general diagram of a very commonly used, so-called I/8I or I/7I, conventional device that serves to adjust the black level of a video signal with a reference voltage Vref. The video signal CVBSi to be adjusted is applied to a first terminal of a capacitor C. The second terminal, A, of capacitor C is connected to a low potential, such as ground, through a current source I, and selectively to a high potential Vcc through a current source 8I that is controlled by a switch K. Terminal A is also connected to the inverting input of a comparator 10, whose non-inverting input receives a reference voltage Vref. Comparator 10 controls switch K. The adjusted video signal, CVBSo, is drawn from terminal A.

When signal CVBSo exceeds voltage Vref, switch K is off, and capacitor C is discharged by a constant current I. When signal CVBSo is below the reference voltage Vref, switch K is on and capacitor C is charged at a constant current 7I. Terms "charge" and "discharge" are used to indicate that the potential of terminal A is pulled up to the high potential Vcc and pulled down to ground, respectively, which does not systematically correspond to actual charging or discharging of capacitor C.

With this configuration, signal CVBSo tends to approach an equilibrium state where the time duration of its portion higher than Vref, hereinafter referred to as "positive half-period", is 7 times longer than the time duration of its portion lower than Vref, hereinafter referred to as "negative half-period". In other words, the ratio between the positive and negative half-periods of signal CVBSo tends to approach the ratio between the charging and discharging currents.

Referring back to FIG. 1, and assuming that the black level B is slightly lower than value Vref, the signal has 52-microsecond positive half-periods and 12-microsecond negative half-periods. The ratio between these periods is equal to 4.3. Assuming that the black level B is slightly higher than voltage Vref, the signal has positive half-periods lasting for 59.3 microseconds, and negative half-periods lasting for 4.7 microseconds. The ratio between these periods is then 12.6. It is noted that, when the black level B varies about the reference value Vref, the time ratio abruptly increases from 4.3 to 12.6.

By selecting an arbitrary value, ranging from 4.3 to 12.6, for the ratio between the charging and discharging current of capacitor C (in the present example, 7), the black level B is always ultimately adjusted with voltage Vref.

FIG. 3 illustrates in more detail the operation of the device of FIG. 2. For the sake of simplicity, FIG. 3 represents a signal CVBSi to be adjusted having an active portion at a constant level. The corresponding adjusted signal CVBSo is represented at a steady state. Each positive half-period of signal CVBSo has, as compared with the corresponding portion of signal CVBSi, a negative slope. This slope corresponds to the discharging of capacitor C with a current I (switch K is open). In contrast, each negative half-period of signal CVBSo has a positive slope 7 times as high as the slope of the positive half-periods. This slope corresponds to the charging of capacitor C with a current 7I (switch K is closed).

Each negative half-period ends before the beginning of the next active portion, but lasts longer than a synchronization pulse S. During the transition interval, signal CVBSo oscillates about value Vref. Accordingly, if the considered slopes are low, the black level B of signal CVBSo is adjusted on value Vref.

If the ratio between the charging and discharging current is chosen lower than value 4.3, in the example of FIG. 3, the high value of the active portion of signal CVBSo would be adjusted on value Vref. In the extreme opposite case, if the ratio between the currents is higher than 12.6, the low level of the synchronization pulses would be adjusted on value Vref.

As represented in FIG. 3 in an exaggerated manner, the adjusted signal CVBSo has slanted portions at places where these portions should be horizontal. In practice, the values of capacitor C and of current I are chosen so that the maximum error is approximately 10 mV for a 700-mV maximum amplitude of the active portion of the signal. This choice results from a tradeoff between the adjustment speed of the signal and a tolerable error.

FIG. 4 represents a portion of the video signal CVBSi to be adjusted, corresponding to a frame retrace Fr. The corresponding adjusted signal CVBSo is also shown. In the vicinity of a frame retrace, a video signal has an active portion with a zero amplitude. The frame retrace includes pulses that successively occur at twice the frequency of pulses S. In the central portion of the frame retrace, corresponding to a frame synchronization pulse train Sf, pulses widen out so that the signal duty cycle is close to 0, whereas the signal duty cycle is close to 1 elsewhere.

As represented by the waveform of the adjusted signal CVBSo, doubling the frequency at the beginning of the frame retrace does not impair the adjustment of the black level (the ratio between the charging and discharging currents is adapted to the duty cycle, close to 1, of the signal). In contrast, during the pulse train Sf, the ratio between the charging and discharging currents is no longer adapted to the duty cycle, close to 0, of the signal. Signal CVBSo progressively shifts upward until its minimum value is adjusted with voltage Vref. At the end of the pulse train Sf; the ratio between the charging and discharging currents is again adapted to the duty cycle of the signal that progressively shifts downward to recover its initial state. However, the compensation time duration for signal CVBSo to recover its initial state is particularly slow and lasts during several lines after the frame retrace. The synchronization pulses of the first lines of the frame are shifted too high to be detected.

A drawback of this shift is that the start-up of the PLL that is adjusted by the synchronization pulses is delayed. This drawback is particularly detrimental when the video signal is provided by a magnetic tape recorder because the synchronization pulses do not successively occur strictly periodically and because the PLL must then react as fast as possible so as to be readjusted with these synchronization pulses, which is incompatible with a delayed start-up of the PLL. As a result, there is a visible distortion at the beginning of the television picture. In the case of a standardized video signal, this drawback is not a major impairment because the synchronization pulses are in phase with the quiescent frequency of the PLL.

Another drawback of such a signal shift is that the information of the first lines cannot be used. Generally, the first lines do not convey picture information, but they can convey teletext information that may be corrupted.

SUMMARY OF THE INVENTION

An object of the invention is to provide a device for adjusting the black level of a video signal of the I/8I-type that causes a reduced, or zero, shift of the video signal during frame retraces.

To achieve this object, the invention provides for reducing the ratio between the charging and discharging currents in the vicinity of a frame synchronization pulse train.

The present invention more particularly applies to a device for adjusting a video signal so that its black level is in coincidence with a predetermined reference level, including a capacitor having a first terminal that receives the video signal and a second terminal that provides the adjusted video signal, and means for discharging the capacitor at a constant current when the adjusted video signal exceeds the reference level and for charging the capacitor at a constant current when the adjusted video signal is below the reference level, the ratio between the charging and discharging currents ranging from 4.3 to 2.6. According to the invention, the device includes means to significantly reduce said current ratio at least during a portion of a frame synchronization pulse train.

According to an embodiment of the invention, said means to reduce decreases the current ratio below 1/13 during the occurrence of a frame synchronization pulse train.

According to an embodiment of the invention, the device includes a charging current source connecting the second terminal of the capacitor to a high potential, and a discharging current source connecting the second terminal of the capacitor to a low potential, the charging current source being controlled by a comparator receiving the signal at the second terminal of the capacitor and a reference voltage.

According to an embodiment of the invention, the device includes an additional current source that is connected in parallel with the discharging current source, controlled by an active signal during the occurrence of a frame synchronization pulse train Sf, the current of the additional source being approximately equal to the current provided by the charging current source.

The foregoing and other objects, features, aspects and advantages of the invention will become apparent from the following detailed description of a preferred embodiment when taken in conjunction with the accompanying drawings.

DETAILED DESCRIPTION

Figure 1:
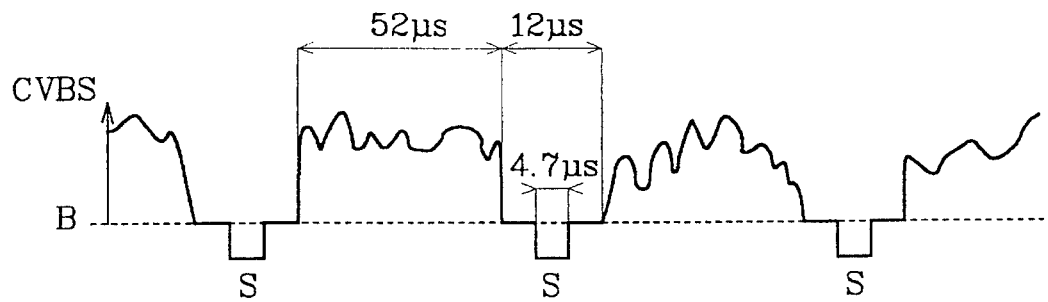
FIG. 1, above described, represents a portion of a video signal.
Figure 2:
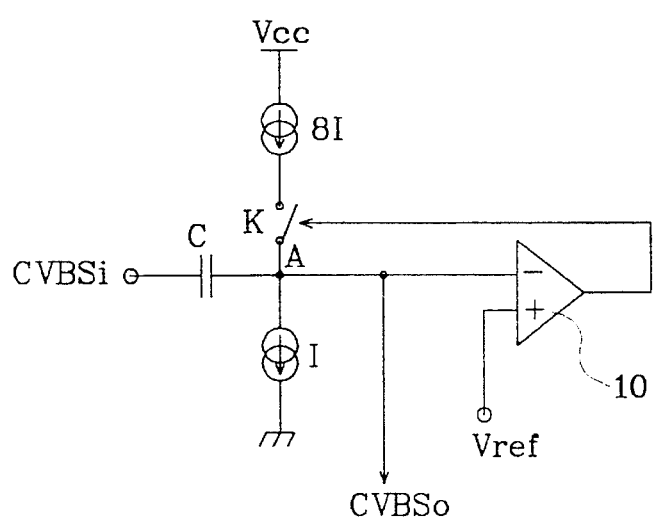
FIG. 2 represents a conventional, so-called I/8I, device allowing for the adjustment of the black level of a video signal on a reference voltage.
Figure 3:
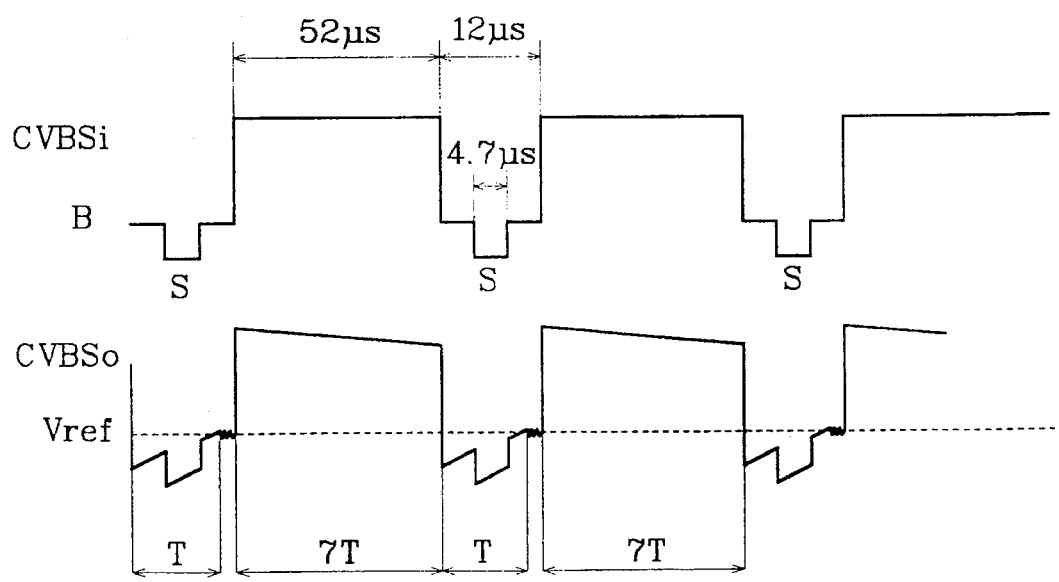
FIG. 3 represents input and output video signals of the device of FIG. 2.
Figure 4:
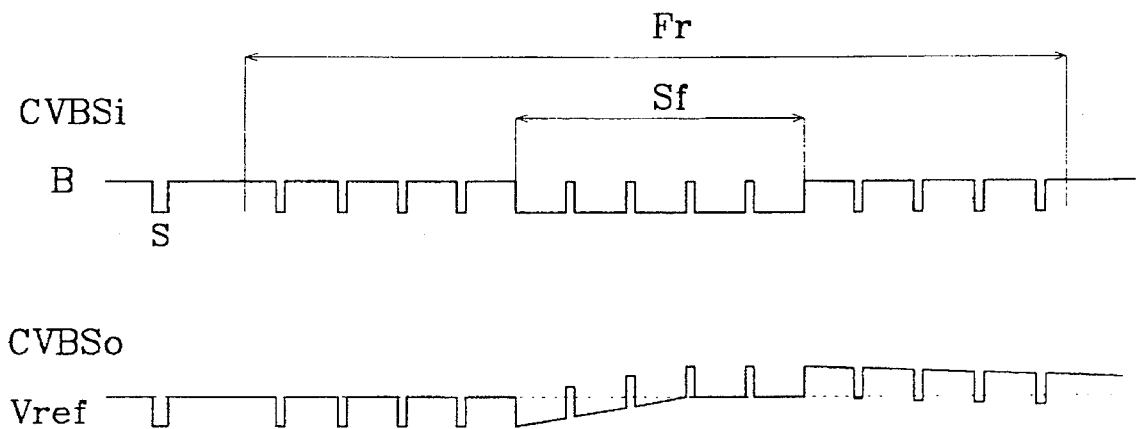
FIG. 4 represents input and output video signals of the circuit of FIG. 2 during a frame retrace.
Figure 5:
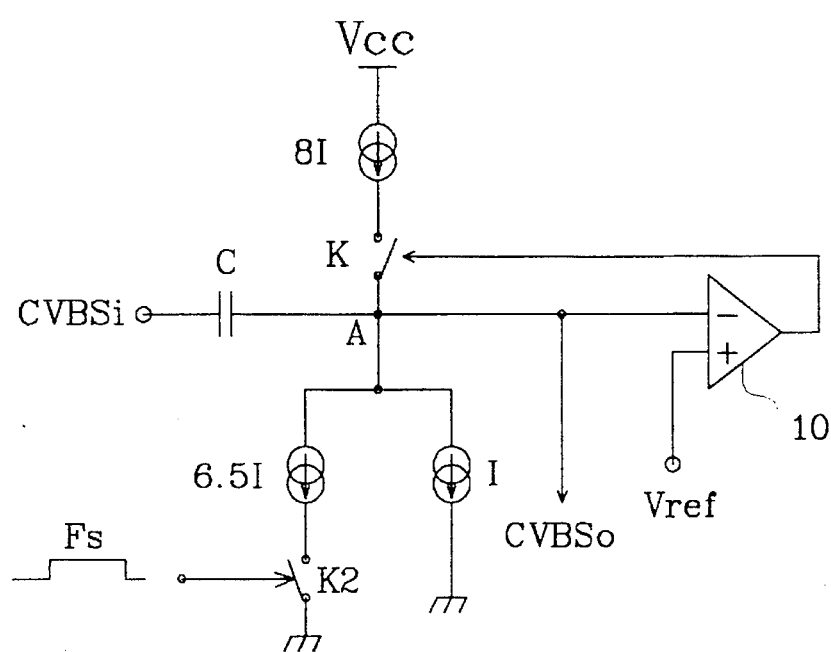
FIG. 5 represents an embodiment of the device for adjusting the black level of a video signal according to the invention.

In FIG. 5, elements identical to the elements of FIG. 2 are labeled with the same reference characters.

The present invention proposes, for decreasing, or cancelling, the shift of the video signal occurring during a frame retrace, to significantly decrease the ratio between the charging and discharging currents of capacitor C during the frame synchronization pulse trains Sf. Ideally, to achieve this purpose, the ratio between the charging and discharging currents during a pulse train Sf is chosen smaller than the ratio between the time duration of the high levels and the low levels of the pulse train. In the present example, this duration ratio is approximately 1/13.

In this case, during a frame synchronization pulse train, the video signal continues to be adjusted so that the high level of such pulse train, that corresponds to the black level, is in coincidence with value Vref.

Choosing a charging/discharging current ratio that is not lower than 1/13, but for example ranging from 1/13 to 1/7, would cause the video signal to shift upward by a negligible value. In this case, the decreased current ratio is preferably maintained for a longer period than the pulse train Sf, which accelerates the recovery of the signal to its initial state.

Of course, the decrease in the current ratio can occur during the whole period of the first frame retrace Fr, or during a portion only of the pulse train Sf.

In the embodiment of the present invention represented in FIG. 5, a current source 6.5I is connected in parallel with the current source I. Source 6.5I is enabled through a switch K2 controlled by a signal Fs that is active during the frame synchronization pulse trains Sf.

With this configuration, outside the duration of the pulse train Sf, the device operates like the conventional device of FIG. 2. During a pulse train Sf, the charging current of capacitor C becomes 8I–7.5I=I/2, and the discharging current becomes 7.5I. The ratio between the charging and discharging currents is then 1/15.

The control signal of switch K2 can be obtained in various manners that those skilled in the art will easily find. For example, a counter can be provided, as conventionally provided to generate an erasure signal during a frame retrace, that counts an adequate number of synchronization pulses while an output signal controlling switch K2 is in an inactive state, and that then counts the pulses of the frame synchronization pulse train while this output signal is in an active state. A monostable flip-flop, that is initialized at each synchronization pulse and set to an active state if the width of the synchronization pulse exceeds, for example, 5 microseconds, can also be provided.

Figure 6:
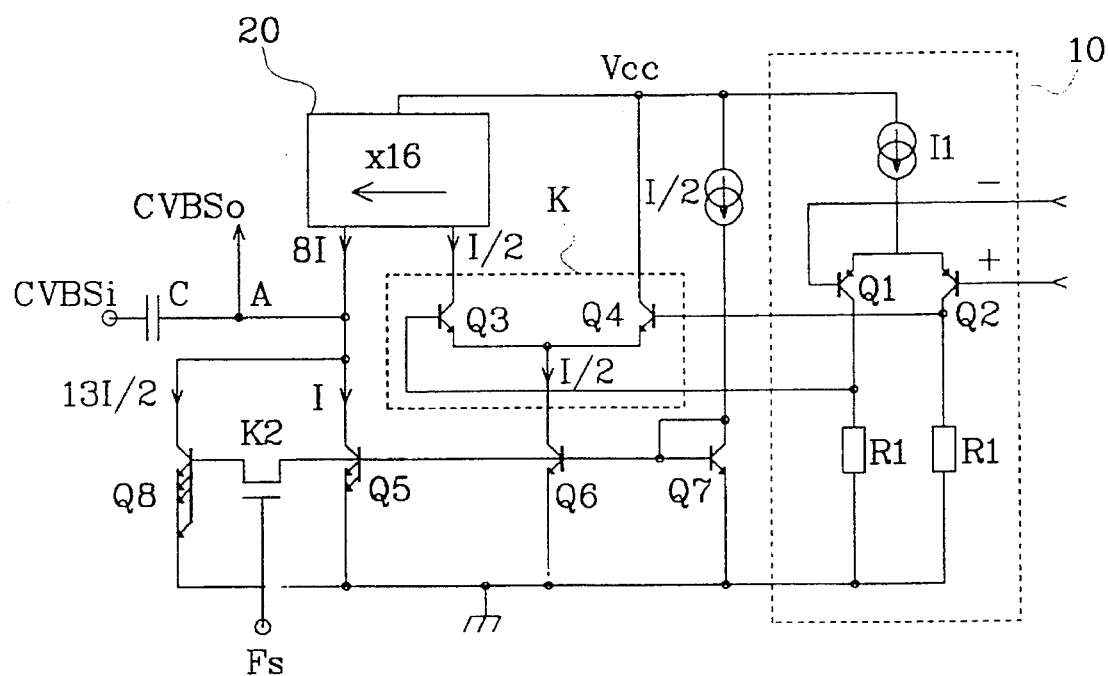
FIG. 6 represents a detailed embodiment of the device of FIG. 5.

FIG. 6 represents in more detail an embodiment of the circuit of FIG. 5. Comparator 10 comprises a differential stage, including PNP transistors Q1 and Q2, that controls a differential stage, including NPN transistors Q3 and Q4. The collectors of transistors Q1 and Q2 are loaded by respective resistors R1, and stage Q1/Q2 is biased by a source I1. Stage QB/Q4 acts as a switch K. The collector of transistor Q3 is connected to the input of a current mirror 20 having a multiplying coefficient 16. The output of current mirror 20 is connected to terminal A of capacitor C. Terminal A is grounded through an NPN transistor Q5, and the emitters of transistors Q3 and Q4 are grounded through a transistor Q6. Transistors Q5 and Q6 form two output transistors of a current mirror whose input transistor is an NPN transistor Q7 diode-connected to ground. A current source provides a current I/2 to the collector of transistor Q7. The emitter's surface of transistor Q6 is equal to the emitter's surface of transistor Q7. The emitter's surface of transistor Q5 is twice as large. Thus, a current I/2 flows in the collector of transistor Q6 and a current I in the collector of transistor Q5, which is permanently drawn from terminal A.

During a first state of comparator 10, the whole current of the collector of transistor Q6 flows through transistor Q3. A current I/2 appears at the input of current mirror 20, and is multiplied by 16 prior to being applied through the output of current mirror 20 to terminal A. Capacitor C is charged.

During a second state of comparator 10, the whole collector current of transistor Q6 flows through transistor Q4. Then, the current mirror 20 no longer provides any current to terminal A. Capacitor C is discharged.

According to the invention, there is provided a transistor Q8, having an emitter surface 13 times as large as the emitter's surface of transistors Q6 and Q7, and that is connected in parallel with transistor QS. The base of transistor Q8 is connected to the base of transistor Q5 through a MOS transistor corresponding to switch K2. The gate of the MOS transistor K2 is controlled by the signal Fs that is active during the frame synchronization pulse trains. When transistor K2 is turned on through signal Fs, transistor Q8 acts as a third output transistor of mirror Q5/Q6/Q7 and its collector current becomes equal to 13I/2, that is, 6.5I.

Various modifications will clearly appear to those skilled in the art, more particularly for determining the various manners to decrease the ratio between the charging and discharging currents of capacitor C during frame synchronization pulse trains. The given examples (current source in parallel with the discharging source I) are particularly simple to implement.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

I claim:

1. A device for adjusting a video signal so that its black level is in coincidence with a predetermined reference level, comprising:

a capacitor having a first terminal that receives the video signal and a second terminal that provides an adjusted video signal;

means for discharging the capacitor with a first constant current when the adjusted video signal exceeds the reference level, and means for charging the capacitor with a second constant current when the adjusted video signal is below the reference level, a ratio between the first and second constant currents ranging from 4.3 to 12.6;

the video signal having a frame synchronization pulse train; and means for reducing said ratio at least during a portion of an occurrence of the frame synchronization pulse train.

2. The device of claim 1, wherein said means for reducing decreases the current ratio to below 1/13 during the occurrence of the frame synchronization pulse train.

3. The device of claim 2, including an additional current source that is connected in parallel with the discharging current source, and is controlled by an active signal during the occurence of the frame synchronization pulse train, a current of said additional current source being substantially greater than a current provided by the discharging current source.

4. The device of claim 1, further comprising:

a charging current source, within the means for charging, coupling the second terminal of the capacitor to a high potential;

a discharging current source, within the means for discharging, coupling the second terminal of the capacitor to a low potential; and a comparator that receives the adjusted video signal at the second terminal of the capacitor and the predetermined reference level and that controls the charging current source in response to a different between the predetermined reference level and the adjusted video signal at the second terminal of the capacitor.

5. A circuit for adjusting the voltage level of an electrical signal to coincide with a predetermined reference level, comprising:

a capacitor having a first terminal that receives the electrical signal and a second terminal that provides an adjusted electrical signal having a voltage;

a charging current source, providing a charging current, that charges the voltage at the second terminal of the capacitor;

a discharging current source, providing a discharging current, that discharges the voltage at the second terminal of the capacitor;

a differential amplifier that accepts the adjusted electrical signal and the predetermined reference level, and the generates a first control signal that controls at least one of the charging and discharging current sources to generate at least two different values of current; and a circuit that provides a second control signal in response to a pattern in the electrical signal, the second control signal controlling at least one of the charging and discharging current sources to generates at least two different values of current.

6. The circuit of claim 5, wherein the electrical signal is a video signal comprising a black level.

7. The circuit of claim 6, wherein the pattern in the electrical signal is a frame retrace pulse train.

8. The circuit of claim 5, wherein the first control signal has two states, a first state operative when the reference level exceeds the adjusted electrical signal, and a second state operative when the adjusted electrical signal exceeds the reference level, and in the first state, the first control signal controls the at least one of the charging and discharging current sources to charge the voltage at the second terminal of the capacitor; and in the second state, the first control signal controls the at least one of the charging and discharging current sources to discharge the voltage at the second terminal of the capacitor.

9. The circuit of claim 8, wherein a current ratio, of the charging current to the discharging current, determines the voltage of the adjusted electrical signal.

10. The circuit of claim 9, wherein the second control signal controls the at least one of the charging and discharging current sources to effect a change in the current ratio.

11. The circuit of claim 10, wherein the electrical signal has a duty cycle that further determines the voltage of the adjusted electrical signal, and the current ratio is adjustable to substantially maintain the voltage of the adjusted electrical signal in response to a change in the duty cycle.

12. The circuit of claim 10, wherein the second control signal has two states that effect two discrete current ratio values, a first current ratio and a second current ratio.

13. The circuit of claim 12, wherein the electrical signal has a minimum value, and changing the current ratio from the first current ratio to the second current ratio in response to a duty cycle change from a value of substantially one to a value of substantially zero maintains the minimum value substantially constant.

14. The circuit of claim 13, wherein the first control signal controls the charging current source, and the second control signal controls the discharging current source.

15. The circuit of claim 14, wherein the discharging current source comprises two parallel-connected current sources, and wherein the first control signal switches the charging current source on and off, and the second control signal switches one of the two parallel-connected current sources on and off.

16. A device for adjusting a video signal so that its black level is in coincidence with a predetermined reference level, comprising:

means for AC-coupling the video signal to generate an adjusted video signal having a voltage;

means for increasing the voltage of the adjusted video signal at a first rate;

means for decreasing the voltage of the adjusted video signal at a second rate;

means for generating a first control signal having a value that is determined by a difference between the adjusted video signal and the reference level;

first means, operative in response to a change in the value of the first control signal, for changing one of the first rate and the second rate;

means for detecting a frame retrace pulse train in the video signal;

second means, operative in response to a detection of a frame retrace pulse train, for changing one of the first rate and the second rate.

17. The device of claim 16, wherein the means for AC-coupling the video signal comprises means for capacitively coupling the video signal using a capacitor.

18. The device of claim 17, wherein the means for respectively increasing and decreasing the voltage comprises current source means.

19. The device of claim 18, wherein the first means for changing one of the first rate and the second rate comprises switching means.

20. The device of claim 19, wherein the second means for changing one of the first rate and the second rate comprises means for selecting between two discrete rates.

21. The device of claim 20, wherein the second means for changing one of the first rate and the second rate further comprises means for changing a ratio of the first rate to the second rate during the occurrence of the frame retrace pulse train.

22. The device of claim 21, wherein the ratio of the first rate to the second rate during the occurrence of the frame retrace pulse train is substantially less than one.

23. A method for adjusting the black level of a video signal to be coincident with a predetermined reference level, comprising the steps of:

AC-coupling the video signal to produce an adjusted video signal;

comparing the adjusted video signal to the reference signal;

charging the adjusted video signal to a higher voltage when the adjusted video signal exceeds the reference signal;

discharging the adjusted video signal to a lower voltage when the reference signal exceeds the adjusted video signal; and varying a rate of the discharging in response to an occurrence of a frame retrace pulse train.

24. The method of claim 23, wherein the step of varying includes the step of selecting between two discrete rates of discharging.

25. The method of claim 24, wherein the step of discharging is continuous, and the step of charging is switched on and off.

26. A device for adjusting a video signal so that its black level is in coincidence with a predetermined reference level, comprising:

a capacitor having a first terminal that receives the video signal and a second terminal that provides an adjusted video signal;

a first current source providing a first constant current that discharges the capacitor when the adjusted video signal exceeds the reference level, and a second current source providing a second constant current that charges the capacitor when the adjusted video signal exceeds the reference level, a ratio between the first and second constant currents ranging from a first value to a second value;

the video signal having a frame synchronization pulse train; and a circuit that adjusts the second current source to reduce said ratio from said first value to said second value at least during a portion of a frame synchronization pulse train.

* * * * *